United States Patent [19]

Ross

[11] Patent Number: 4,807,278
[45] Date of Patent: Feb. 21, 1989

[54] TELECOMMUNICATION CONTROLLER HAVING A TELEPHONE LINE SHARING FUNCTION

[76] Inventor: David W. Ross, 732 S. 93 St., West Allis, Wis. 53214

[21] Appl. No.: 48,736

[22] Filed: May 11, 1987

[51] Int. Cl.⁴ ...................... H04M 1/70; H04M 11/00
[52] U.S. Cl. .................................. 379/184; 379/194; 379/93
[58] Field of Search ................ 379/93, 95, 96, 97, 379/98, 161, 184, 194, 195, 208, 442, 443, 106, 107, 168, 377, 379

[56] References Cited

U.S. PATENT DOCUMENTS

| | | | |
|---|---|---|---|
| 4,000,375 | 12/1976 | Kawamura | 379/184 |
| 4,059,727 | 11/1977 | Kingswell et al. | 379/107 X |
| 4,074,081 | 2/1978 | Humm | 379/379 X |
| 4,306,116 | 12/1981 | McClure et al. | 379/98 X |
| 4,378,470 | 3/1983 | Murto et al. | 379/97 |
| 4,444,999 | 4/1984 | Sparrevohn | 379/380 X |
| 4,469,917 | 9/1984 | Shelley | 379/107 X |
| 4,640,988 | 2/1987 | Robinton | 379/37 X |
| 4,645,877 | 2/1987 | Curtin | 379/184 X |

Primary Examiner—Keith E. George
Attorney, Agent, or Firm—Quarles & Brady

[57] ABSTRACT

A control system has two switches for connecting a telephone device and a data device to a common telephone line. Separate circuits are provided to sense the current flowing between the telephone line and each of the devices. The circuits are coupled to the switches so that when the sensed current for one of the devices exceeds a given level, the switch for the other device is activated to disconnect the other device from the telephone line.

7 Claims, 1 Drawing Sheet

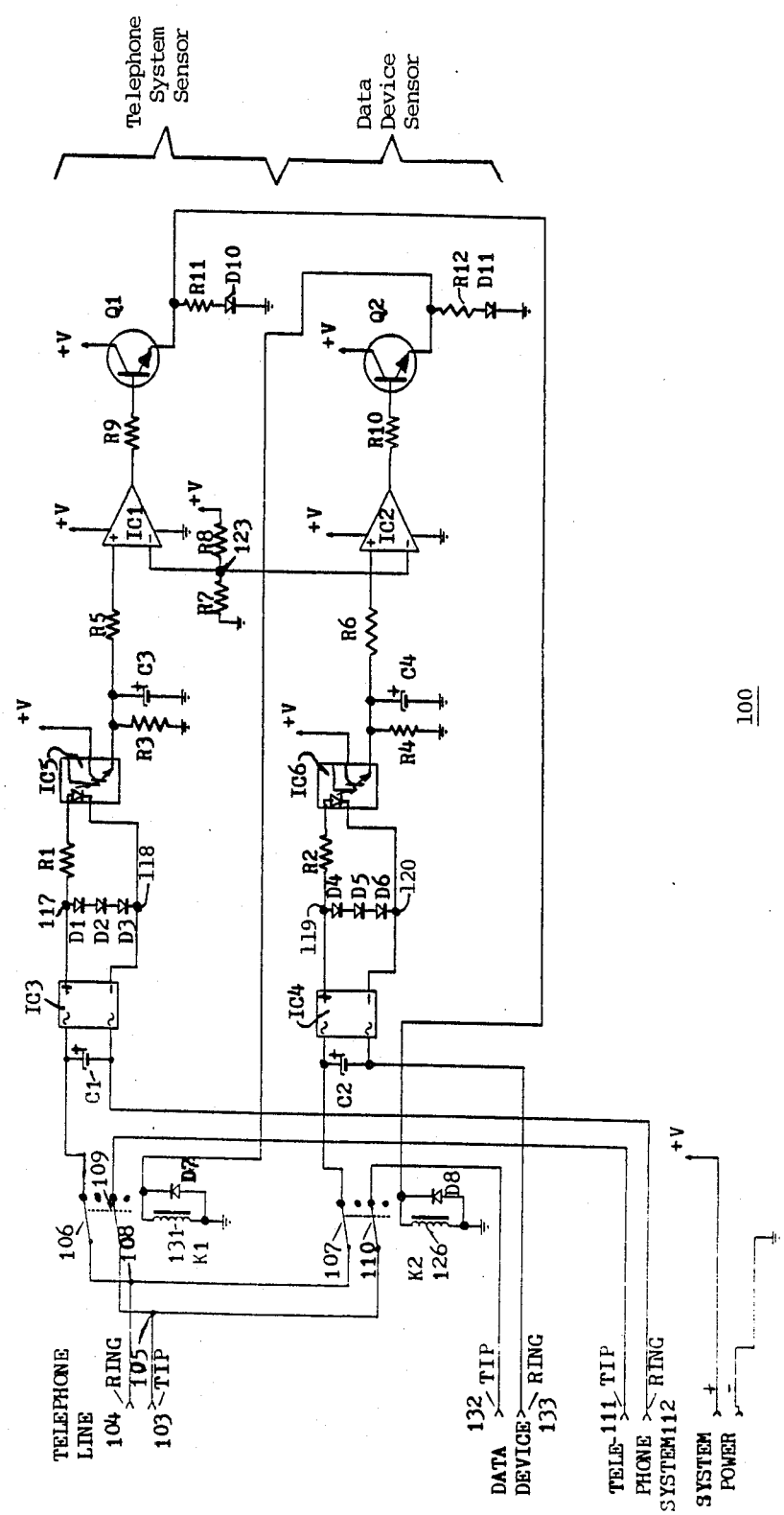

TELECOMMUNICATION CONTROLLER HAVING A TELEPHONE LINE SHARING FUNCTION

The present invention relates to the sharing of a telephone line by a telephone system and a computer data communication device.

BACKGROUND OF THE INVENTION

With increasing frequency, telephone lines are being used in conjunction with data devices for data communication. Typical data devices in this discussion include computer modems, facsimile machines and any other data equipment which are capable of communicating over a standard two-wire telephone line.

Costs involved in maintaining separate telephone lines for voice and data make it desirable to share a telephone line with both a telephone system, such as a telephone instrument, and a data device. However, problems often result from connecting a data device and a telephone instrument directly to the same telephone line. The most common problem occurs when a data device is using a telephone line to communicate with another similar distant data device, and a telephone instrument on the same telephone line is picked up. The electrical noise generated on the telephone line by the connection of the telephone instrument causes data flow errors between the data devices. The operators of the data equipment may then be required to reset the data devices and restart the data transmissions.

It is, therefore, desirable to have a line control device which will allow only a telephone system or a data device to operate on the same telephone line at one time. This will prevent data flow errors on the telephone line between data devices resulting from the connection and use of a telephone system on that same telephone line.

There are many variations in the electrical characteristics of the telephone circuits, data devices and telephone systems. Typical variations in telephone circuits include (1) an open circuit operating voltage of the telephone line between 15 and 52 volts direct current, (2) a loop resistance of the telephone line between 500 and 4000 ohms and (3) an active, or off-hook, resistance of the telephone system and the data device between 30 and 500 ohms. The control device used must also be able to pass, yet be insensitive to, the high voltage ringing current, usually between 75 and 120 volts alternating current at 16 to 75 hertz. For an automatic line control device to properly detect the active state of a data device or a telephone system on a shared telephone line, the control device must be able to operate over these wide variations of electrical characteristics. The wider the range of electrical variations over which the device can operate, the more universal the compatability of the control device with different telephone lines, data devices and telephone systems.

SUMMARY OF THE INVENTION

An automatic telephone line control device has a pair of connectors to which a standard two wire telephone line may be connected. Two pairs of output connectors are provided to connect two telephone line using apparatus to the control device. Each of the pairs of output connectors is coupled to the connectors for the telephone line by a separate electrically operable switch.

A separate current sensing circuit is coupled to each pair of output connectors to sense the current flowing through at least one of the connectors of each pair. When the current through one of the pairs of output connectors rises above a given level, the sensing circuit sends a signal to the electrically operable switch for the other pair. This signal causes the switch to disconnect the other pair of output connectors from the telephone line connectors.

An object of the present invention is to provide a telephone line control circuit which allows a data device and a telephone system to have equal access to a common telephone line.

Another object is to enable the control circuit to provide such equal access while allowing only the data device or telephone system to operate on the telephone line at any given time.

Another object of the present invention is to allow two apparatus to share access to a common telephone line without one apparatus interfering with the communications by the other apparatus.

BRIEF DESCRIPTION OF THE DRAWING

The FIGURE of the drawing is a schematic diagram of the present telephone line control circuit.

DETAILED DESCRIPTION OF THE INVENTION

With reference to the FIGURE, an automatic telecommunication control circuit 100 has first and second system power terminals 101 and 102 to which 12 volt direct current system power is applied. The first system power terminal 101 is connected to system ground, which is not the same as earth ground. The second power terminal 102 serves as a positive voltage source for the circuit components.

The incoming telephone line tip conductor and the ring conductor are connected to telephone line connectors 103 and 104. The telephone line tip connector 103 is coupled to a terminal of a first switch pole 106 of a first DPST relay K1 and to a terminal of a first switch pole 107 of a second DPST relay K2. Another terminal of the first switch pole 106 of relay K1 s coupled to a telephone system tip connector 111. Another terminal of the first pole 107 of the second relay K2 connects to a data device tip connector 132. The telephone line ring connector 104 is coupled to a terminal of a second switch pole 109 of the first relay K1 and to a terminal of a second switch pole 110 of the second relay K2.

The ring connectors for the telephone system and the data device 112 and 133 respectively, are coupled to two current sensing circuits which detect whether the telephone system or the data device is using the telephone line. Both sensing circuits are identical. As used herein the telephone system may be a single telephone instrument, a PABX, or similar equipment.

For the telephone sensor circuit, the telephone system ring connector 112 is connected to the negative terminal of a first electrolytic capacitor C1 and to the one alternating current input of a bridge rectifier IC3. The other alternating current input of bridge rectifier IC3 is connected to the positive terminal of first electrolytic capacitor C1 and to another terminal of the second switch pole 109 of the first relay K1.

The positive output terminal of bridge rectifier IC3 connects to node 117 and its negative output terminal is connected to node 118. Three diodes D1, D2 and D3 are connected in a forward biased series between nodes 117 and 118 to form a voltage clamping mechanism. A first resistor R1 extends between node 117 and the anode terminal of the light emitting diode (LED) contained in a first opto-isolator IC5. The cathode of the LED contained in the first opto-isolator IC5 is connected to node 118. The opto-isolator provides the electrical isolation between the telephone line circuits and the control devices of the sensor circuit as required by the regulations of the Federal Communications Commission.

The collector of the phototransistor contained in first opto-isolator IC5 is connected to the positive voltage source. The emitter of the phototransistor in the first opto-isolator IC5 is coupled by a current limiting resistor R5 to the non-inverting input terminal of comparator IC1. A third electrolytic capacitor C3 and a third resistor R3 couple the emitter of opto-isolator IC5's transistor to ground.

Seventh and eighth resistors R7 and R8 are in series between system ground and the positive voltage source to form a voltage divider. The inverting input terminal of the first comparator IC1 is connected to node 123 between the seventh and eighth resistors R7 and R8. The potential at node 123 serves as a reference potential for the first comparator IC1.

The output terminal of the first comparator IC1 is coupled to the base of a first NPN transistor Q1 by a current limiting resistor R9. The collector of transistor Q1 is connected to the positive voltage source. A current limiting resistor R11 and LED D10 are connected in series between the emitter of transistor Q1 and ground. The emitter of the first transistor Q1 is also connected to one end of the coil of the second relay K2. The other end of the coil 126 of relay K2 is directly connected to ground. A reverse voltage clamping diode D8, which protects transistor Q1 from relay coil voltage surges, is connected across the coil 126 of relay K2 with its anode connected to the end of the coil that is connected to ground.

For the data device sensor circuit, the ring connector 133 is connected to the negative terminal of a second electrolytic capacitor C2 and to one alternating current input terminal of bridge rectifier IC4. The other alternating current input terminal of bridge rectifier IC4 connects to the positive terminal of second electrolytic capacitor C2 and to the other terminal of the second switch pole 110 of the second relay K2.

The positive output terminal of bridge rectifier IC4 connects to node 119 and its negative output terminal is connected to node 120. Three diodes D4, D5 and D6 are connected in a forward biased series between nodes 119 and 120 to form a voltage clamping mechanism. A second resistor R2 extends between node 119 and the anode of the LED contained in a second opto-isolator IC6. The cathode connection of the LED contained in the second opto-isolator IC6 is coupled to node 120.

The collector of the phototransistor contained in a second opto-isolator IC6 is connected to the positive voltage source. The emitter of the phototransistor contained in second opto-isolator IC6 is coupled by a sixth resistor R6 to the non-inverting input terminal of a second voltage comparator IC2. A fourth electrolytic capacitor C4 and a fourth resistor R4 couple the emitter of the phototransistor in opto-isolator IC6 to ground.

The inverting input terminal of the second comparator IC2 is connected to the reference potential at node 123. The output terminal of the second comparator IC2 is coupled by a current limiting resistor R10 to the base of a second NPN transistor Q2. A current limiting resistor R12 is connected in series with an LED D11 between the emitter of second transistor Q2 and ground. The collector of the second transistor Q2 is connected to the positive voltage source and its emitter is connected to one end of the coil 131 of the first relay K1. The other end of the coil 131 of first relay K1 is connected to ground. A second reverse voltage clamping diode D7 extends across the coil of first relay K1 which with its anode connected to ground.

With reference to the FIGURE, there are a total of four pairs of connections to the present device in its intended application. A source of 12 volt direct current power is connected to terminals 101 and 102. A standard two-wire telephone line is connected to connectors 103 and 104. A two-wire telephone line output connection to a telephone system is provided by connectors 111 and 112. A two-wire output connection to a data device is made to connectors 132 and 133.

A standard telephone line carries three types of electrical signals. (1) The first signal is an alternating current which carries the transmitted information, voice or data. The frequency range of this information signal is typically from 50 to 4,000 Hertz, with a total power of one milli-watt or less. (2) The second type of signal which is present in all normal operating modes of a two-wire telephone line is an open circuit D.C. voltage typically in the range of 15 to 52 volts. This voltage drops significantly when a telephone instrument or data device goes "off hook" to use the line. This voltage drop is detected by the switching equipment supplying the voltage to determine when a telephone instrument or a data device has gone "off hook" and seeks access to the telephone line. 3) The third signal type is an alternating current ringing signal in the range of 75 to 120 volts at 16 to 75 Hertz. This voltage is used as a signal to devices on the telephone line to become active and connect to the telephone line to accept incoming voice or data transmissions.

When neither the telephone system or the data device is using the telephone line, the switches of both relays K1 and K2 are in a normally closed position as shown in the FIGURE. This couples the tip connector 103 of the incoming telephone line to both the data device tip connector 132 and the telephone system tip connector 111. The close state of relays K1 and K2 also couples the ring connector 104 of the incoming telephone line through both sensor circuits to the data device ring connector 133 and the phone system ring connector 112. In this state when both the data device and telephone system are "on hook", the current flowing through each of the sensor's circuits is insufficient to turn on its respective output transistor Q1 or Q2. Therefore, the coils of relays K1 and K2 are in a de-energized state.

Then if the data device connected to terminals 132 and 33 becomes active and creates a low off-hook resistive path between terminals 132 and 133, direct current will flow from telephone line tip connector 103 through switch pole 107 of relay K2 to the data device tip connector 132. A return current flows from the data device ring connector 133 through the data device sensor circuit and switch pole 110 to the telephone line ring connector 104.

Specifically, this direct current will flow through the bridge rectifier IC4 which enables the control circuit 100 to operate even if the tip and ring connections to the telephone line are inadvertently reversed. In the case of such reversal, the current flow through the sensor circuit will still be in the proper direction to activate the circuit. As noted previously, the voltage from the incoming telephone line across terminals 103 and 104 may vary greatly from telephone line to telephone line. The series connections of diodes D4, D5 and D6 provides a mechanism which clamps this voltage to a fixed value independent of the current flowing through the data device sensor circuit. The clamped voltage that is across nodes 119 and 120 is applied across the series connection of the LED in opto-isolator IC6 and the current limiting resistor R2.

In this state, when the data device has seized the telephone line, current flows through the LED in the second opto-isolator IC6. The light from the LED in the second opto-isolator IC6 illuminates the phototransistor contained within the opto-isolator to render the phototransistor conductive. When the phototransistor becomes conductive the 12 volts from the positive source is applied through resistor R6 to the non-inverting input of second comparator IC2. Previously this non-inverting input had been at ground potential which produced a negative output from the comparator holding transistor Q2 in an off or non-conductive state. When the phototransistor in IC6 becomes conductive and applies the 12 volts to the non-inverting input of IC2, the voltage at that input rises above the reference voltage applied to the non-inverting input of the second comparator IC2. This causes the output of the comparator IC2 to rise to a potential near the 12 volt positive voltage source. When this positive potential is applied to the base of NPN transistor Q2 through current limiting resistor R10, the transistor is turned on. When this occurs, the positive 12 volts is applied across the coil of the first relay K1 which activates the relay opening the DPST switch poles 106 and 109. This disconnects the telephone system from the telephone line.

If, at this point, the telephone system becomes active and seeks access to the telephone line, the disconnection by relay K1 prevents the telephone system from interfering with the existing data communications on the telephone line from the data device.

When the data device becomes idle and goes into an on-hook state, the resistance it presents across terminals 132 and 133 is relatively high. This high resistance decreases the current flowing through the data device sensor circuit deactivating it. Specifically, either no current flows through the LED in optoisolator IC6 or the current flow is so small that the LED is not illuminated. This renders the phototransistor in IC6 non-conductive dropping the potential applied to the non-inverting input of comparator IC2 to ground potential. As a result, the potential at the output of the comparator IC2 drops to ground potential turning off transistor Q2 and de-energizing the first relay K1. The switch poles 106 and 109 of relay K1 thereby return to their normally closed state coupling the tip and ring connectors 111 and 112 for the telephone system to the telephone line connectors 103 and 104. This returns the operation of the control circuit 100 to the state where both the data device connectors 132 and 133 and the telephone system connectors 111 and 112 are coupled to the incoming telephone line connectors 103 and 104.

If both the telephone system and the data device have been idle and then the telephone system becomes active, a low off-hook resistive path is created between terminals 111 and 112. This low resistance causes a direct current originating from telephone line tip connector 103 to flow through switch 106 of relay K1 to the telephone system tip connector 111. A return current flows from the ring connector 112 through the telephone system sensor circuit and switch pole 109 to the ring connector 104 of the telephone line.

The current flowing through the telephone system sensor circuit will activate its sensor circuit in the same manner as described above with respect to the data device sensor circuit. Specifically, the line current rectified by bridge IC3 will flow through the LED of the first opto-isolator IC5 turning on its phototransistor. This will apply a positive voltage to the non-inverting input of the first comparator IC1 rendering its output positive. The positive output from the comparator IC1 will turn on the first NPN transistor Q1 activating the second relay K2 to open its DPST switch. This disconnects the data device from the telephone line connectors 103 and 104. In this state the telephone system has accessed the telephone line and any activity by the data device will not interfere with that connection. For example the data device is prevented from accessing the telephone line and sending data tones over the line while the telephone system has accessed the telephone line.

The present control circuit 100 also prevents the ringing signal applied by the telephone company over the telephone line from activating either of the sensor circuits. Yet the ringing signal is coupled to the data device and the telephone system. Specifically, electrolytic capacitors C1 and C2 pass the alternating ringing signals to the telephone system and the data device respectively. Resistor R3 and capacitor C3 at the output of the opto-isolator IC5 and resistor R4 and capacitor C4 at the output of opto-isolator IC6 provide RC time constants in their respective sensor circuits. These time constants prevent the ringing signal from turning on the corresponding output transistor, Q1 or Q2. Specifically, the values for these resistors and capacitors are selected so that the time constant is approximately three times the period of the lowest ringing signal frequency, about sixteen Hertz. Therefore, even though the ringing signals when rectified by bridges IC3 and IC4 will momentarily cause the phototransistor in opto-isolators IC5 and IC6 to become conductive, the RC time constant prevents the potential at the non-inverting inputs of the comparators IC1 and IC2 from ever reaching a level above the potential at the inverting inputs. Therefore, the output transistors Q1 and Q2 will never be turned on by the ringing signal.

In the idle state, the present automatic telecommunication control circuit 100 couples both the data device and the telephone system to the incoming telephone line so that both may receive a ringing signal that is transmitted over the telephone lines. The present device also provides a mechanism for allowing the ringing signals to be sent from the telephone line to both the data device and the telephone system without activating the sensor circuits within the control device 100. However, when either the data device or the telephone system goes into an off-hook state, the other one is disconnected from the telephone line. This prevents the other one of the data device or the telephone system from interfering with established communications on the telephone line. In addition, the unique nature of the present control device 100 allows it to be used with telephone systems having a wide range of signal characteristics.

I claim:

1. An apparatus for coupling a plurality of telephone line utilizing devices to a shared telephone line comprising:
   a plurality of electrically operable switches, each of which couples one of the utilizing devices to the shared telephone line;
   a plurality of electric current sensing means, each having means for producing an output voltage which corresponds to the level of current flowing between the telephone line and a different one of the utilizing devices, a voltage comparator for comparing the output voltage to a reference voltage, and a capacitor and a resistor coupled in parallel between an input of said voltage comparator and substantially ground potential to inhibit a ringing signal on the telephone line from activating said switches; and
   means, responsive to the voltage comparators of said plurality of current sensing means, for activating said switches to disconnect the other utilizing devices from the telephone line when the current flowing between the telephone line and one of the utilizing devices exceeds a given level.

2. The apparatus as recited in claim 2 wherein each of the means for producing an output voltage includes an opto-isolator.

3. The apparatus as recited in claim 1 wherein each of said current sensing means is coupled to the telephone line by a bridge rectifier.

4. An apparatus for coupling first and second utilizing devices to a telephone line comprising:
   a voltage supply means separate from the telephone line;
   a first switch coupling the first utilizing device to the telephone line;
   a second switch coupling the second utilizing device to the telephone line;
   a first rectifier bridge having one alternating current terminal coupled to the telephone line, another alternating current terminal coupled to the first utilizing device, and two direct current terminals;
   a first opto-isolator coupled to the direct current terminals of said first bridge rectifier and coupled to the voltage supply means to produce an output voltage representative of the level of current flowing between the telephone line and the first utilizing device;
   a first voltage comparator for comparing the output voltage from the first opto-isolator to a reference voltage level;
   first means, responsive to an output signal from the first voltage comparator, for activating said second switch to disconnect the second utilizing device from the telephone line;
   a first means, connected to an input of said first voltage comparator, for preventing a ringing signal on the telephone line from causing said first voltage comparator to produce an output signal which activates said second switch;
   a second rectifier bridge having one alternating current terminal coupled to the telephone line, another alternating current terminal coupled to the second utilizing device, and two direct current terminals;
   a second opto-isolator coupled to the direct current terminals of said second bridge rectifier and coupled to the voltage supply means to produce an output voltage representative of the level of current flowing between the telephone line and the second utilizing device;
   a second voltage comparator for comparing the output voltage from the second opto-isolator to a reference voltage level;
   second means, responsive to an output signal from the second voltage comparator, for activating said first switch to disconnect the first utilizing device from the telephone line; and
   a second means, connected to an input of said second voltage comparator, for preventing a ringing signal on the telephone line form causing said second voltage comparator to produce an output signal which activates said first switch.

5. The apparatus as recited in claim 4 further comprising a separate rectifier means coupled across the direct current terminals of each of the first and second rectifier bridges.

6. The apparatus as recited in claim 4 wherein
   said first means for preventing includes a first resistor and a first capacitor coupled to an input of said first voltage comparator and having an RC time constant which prevents the ringing signal from causing said first comparator to produce the output signal to which said first means for activating responds; and
   said second means for preventing includes a second resistor and a second capacitor coupled to an input of said second voltage comparator and having an RC time constant which prevents the ringing signal from causing said second comparator to produce the output signal to which said second means for activating responds.

7. The apparatus as recited in claim 4 wherein
   said first means for preventing includes a first resistor coupled between an input of said first voltage comparator and ground, and first capacitor coupled between the input of said first voltage comparator and ground; and
   said second means for preventing includes a second resistor coupled between an input of the second voltage comparator and ground, and a second capacitor coupled between the input of the second voltage comparator and ground.

* * * * *

UNITED STATES PATENT AND TRADEMARK OFFICE
CERTIFICATE OF CORRECTION

PATENT NO. : 4,807,278
DATED : February 21, 1989
INVENTOR(S) : David W. Ross

It is certified that error appears in the above-identified patent and that said Letters Patent is hereby corrected as shown below:

In Column 4,
    at Line 55, change "33" to --133--;
In Column 7,
    at Line 24, Claim 2, change "2" to --1--;
In Column 8,
    at Line 23, Claim 4, change "form" to --from--;
    at Line 48, Claim 7, change "and first" to --and a first--.

Signed and Sealed this

Twenty-fifth Day of July, 1989

Attest:

DONALD J. QUIGG

Attesting Officer      Commissioner of Patents and Trademarks